United States Patent
Phelan et al.

(10) Patent No.: US 10,496,545 B2
(45) Date of Patent: Dec. 3, 2019

(54) DATA CACHING IN A LARGE-SCALE PROCESSING ENVIRONMENT

(71) Applicant: HEWLETT PACKARD ENTERPRISE DEVELOPMENT LP, Houston, TX (US)

(72) Inventors: Thomas A. Phelan, San Francisco, CA (US); Michael Moretti, Saratoga, CA (US); Joel Baxter, San Carlos, CA (US); Lakshminarayanan Gunaseelan, Cupertino, CA (US); Ramaswami Kishore, San Francisco, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/950,860

(22) Filed: Nov. 24, 2015

(65) Prior Publication Data
US 2017/0147497 A1    May 25, 2017

(51) Int. Cl.
*G06F 12/08*    (2016.01)
*G06F 12/0868*    (2016.01)
*G06F 12/084*    (2016.01)

(52) U.S. Cl.
CPC ........ *G06F 12/0868* (2013.01); *G06F 12/084* (2013.01); *G06F 2212/1021* (2013.01)

(58) Field of Classification Search
CPC .................. G06F 12/0875; G06F 2212/452
See application file for complete search history.

(56) References Cited

U.S. PATENT DOCUMENTS

| | | | |
|---|---|---|---|
| 6,601,065 B1* | 7/2003 | Nelson | G06F 17/30427 707/781 |
| 2013/0124483 A1* | 5/2013 | Furuhashi | G06F 16/22 707/661 |
| 2013/0152047 A1* | 6/2013 | Moorthi | G06F 11/368 717/124 |

(Continued)

OTHER PUBLICATIONS

Steven Vaughan-Nichols, Containers vs. virtual machines: How to tell which is the right choice for your enterprise, Apr. 28, 2015, available at: http://www.itworld.com/article/2915530/virtualization/containers-vs-virtual-machines-how-to-tell-which-is-the-right-choice-for-your-enterprise.html.*

(Continued)

*Primary Examiner* — Ryan Bertram
(74) *Attorney, Agent, or Firm* — Hewlett Packard Enterprise Patent Department (57) ABSTRACT

Systems, methods, and software described herein facilitate an enhanced service architecture for large-scale data processing. In one implementation, a method of providing data to a large-scale data processing architecture includes identifying a data request from a container in a plurality of containers executing on a host system, wherein the plurality of containers each run an instance of a large-scale processing framework. The method further provides identifying a storage repository for the data request, and accessing data associated with the data request from the storage repository. The method also includes caching the data in a portion of a cache memory on the host system allocated to the container, wherein the cache memory comprises a plurality of portions each allocated to one of the plurality of containers.

19 Claims, 5 Drawing Sheets

(56) References Cited

U.S. PATENT DOCUMENTS

| | | | |
|---|---|---|---|
| 2014/0068197 A1* | 3/2014 | Joshi | G06F 12/0866 711/135 |
| 2015/0081979 A1* | 3/2015 | Banta | G06F 12/0804 711/135 |
| 2015/0095308 A1* | 4/2015 | Kornacker | G06F 17/30448 707/718 |
| 2016/0098285 A1* | 4/2016 | Davis | G06F 9/45545 718/1 |
| 2017/0024352 A1* | 1/2017 | Lavasani | G06F 13/36 |
| 2018/0307631 A1* | 10/2018 | Braddy | G06F 13/1668 |

OTHER PUBLICATIONS

Haoyuan Li, Tachyon: Reliable, Memory Speed Storage for Cluster Computing Frameworks, Nov. 2014, ACM.*

* cited by examiner

DATA CACHING IN A LARGE-SCALE PROCESSING ENVIRONMENT

TECHNICAL FIELD

Aspects of the disclosure are related to computing hardware and software technology, and in particular to the management of virtual clusters in a large-scale processing environment.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Spark, Amazon S3, and CloudStore, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying host computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes. However, although virtual nodes may more efficiently use the resources of the underlying host computing systems, difficulties arise in scaling the virtual nodes and providing data from large storage repositories to the individual virtual nodes.

Overview

The technology disclosed herein facilitates an enhanced service architecture for large-scale data processing. In one implementation, a method of providing data to a large-scale data processing architecture includes identifying a data request from a container in a plurality of containers executing on a host system, wherein the plurality of containers each run an instance of a large-scale processing framework. The method further provides identifying a storage repository for the data request, and accessing data associated with the data request from the storage repository. The method also includes caching the data in a portion of a cache memory on the host system allocated to the container, wherein the cache memory comprises a plurality of portions each allocated to one of the plurality of containers.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Large-scale processing environments (LSPEs) may employ containers running via host computing systems to provide efficient execution of job processes. These containers, which may include Linux containers, Docker containers, jails, and like, each contain the necessary large-scale processing framework (LSPF) and dependencies required to perform operations on a target data set. Rather than allocating an operating system to each of the processing nodes within the LSPE, containers may share a host operating system and common resources, such as files, databases, and common processes.

In addition to the containers, the LSPE further includes data sources that may be stored on the same physical computing systems as the containers or on separate physical computing systems and devices that are accessible using the internet or some other similar network. These data sources may be stored using Hadoop distributed file system (HDFS), versions of the Google file system, versions of the Gluster file system (GlusterFS), or any other distributed file system version—including combinations thereof. Data sources may also be stored using object storage systems such as Swift.

To assign job processes, such as Apache Hadoop processes, Apache Spark processes, Disco processes, or other similar job processes to the host computing systems within a LSPE, a control node may be maintained that can distribute jobs within the environment. The control node may identify a job and preferences associated with the job, such as an amount of processing resources, number of nodes, and the like, and allocate containers as required by the particular job process. Once allocated, the container nodes may execute and provide the desired operations on a data set.

In the present example, to provide the desired operations on the data stored within the data sources, a cache service is provided capable of acting as an intermediary between the containers and the data sources. This cache service, which is shared between the containers, identifies a data request from a container, determines a data source associated with the request, accesses the data associated with the request from the data source, and caches the data within allocated cache memory accessible by the requesting container. This cache memory allows the containers to directly access data from the host without first caching the data to the host and transferring the data to a location associated with the container. In some implementations, the cache memory may be allocated a portion of physical memory on the host computing system, which can be distributed as sub-portions to the individual containers. This allocation of physical memory includes addresses accessible by the containers to retrieve and write data for LSPF operations.

Figure 1:
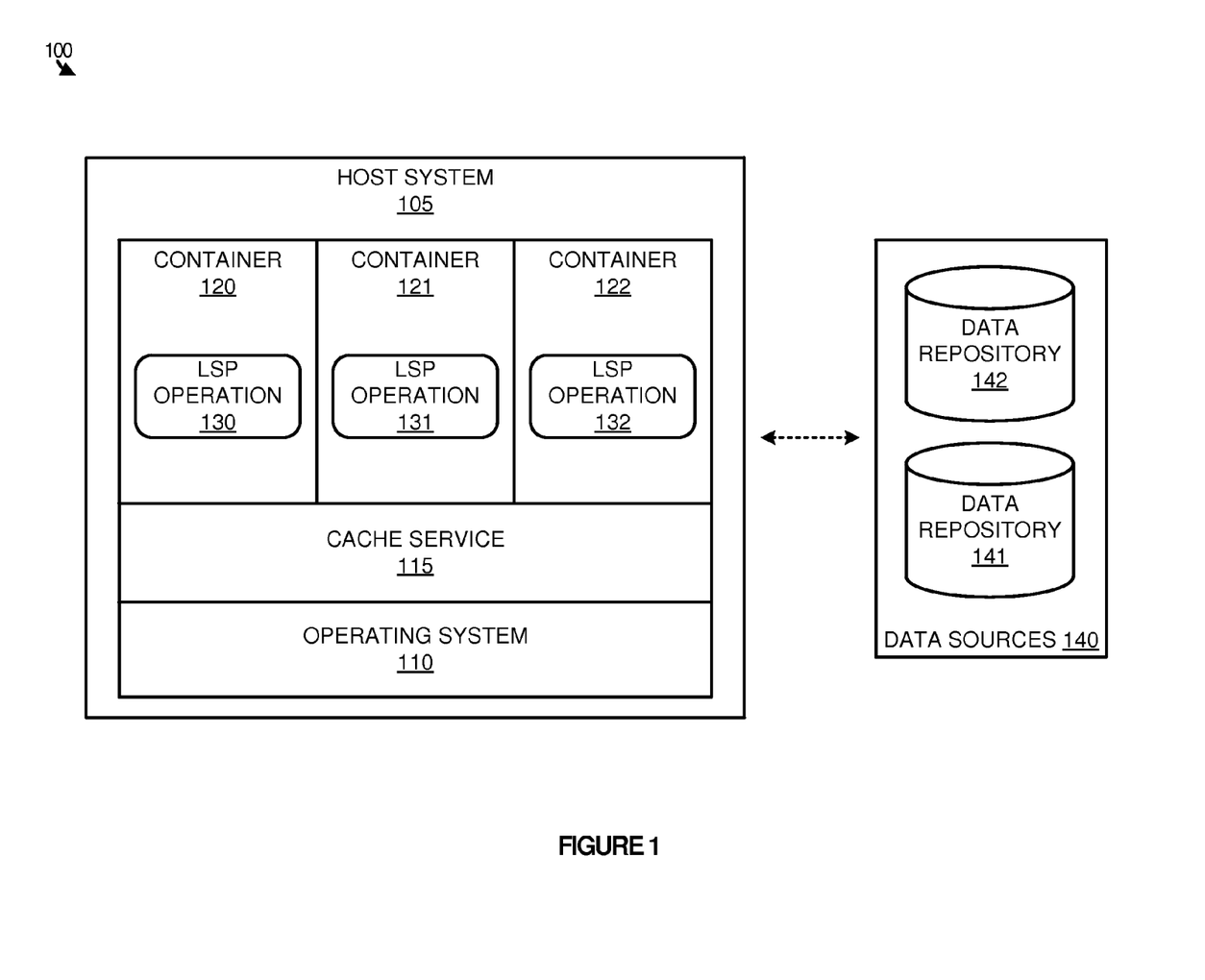
FIG. 1 illustrates a computing architecture to cache data for large-scale processing containers.

Referring now to FIG. 1, FIG. 1 illustrates a computing architecture 100 to cache data for large-scale processing containers. Computing architecture 100 includes host system 105 and data sources 140. Host system 105 further includes operating system 110, cache service 115, and containers 120-122. Data sources 140 further includes data repositories 141-142. Although illustrated separate in the present example, it should be understood that data repositories 141-142 might be stored wholly or partially on host system 105. However, when stored separately, host system 105 may communicate with data repositories 141-142 using the internet or some other communication network.

In operation, containers 120-122 are initiated on host system 105 to provide large scale processing operations on job processes allocated to the computing environment. These job processes may include Apache Hadoop job processes, Apache Spark job processes, or any other similar job processes. To provide the operations for the job processes, containers 120-122 include large-scale processing (LSP) operations 130-132, which correspond to the necessary LSPFs to provide the operations desired by the cluster. In addition to the containers, each of the containers share cache service 115, which comprises a utility to cache data for operations within the containers. In particular, containers 120-122 are capable of sharing operating system 110, and may further share one or more repositories and/or applications from the host system. Accordingly, rather than a separate cache service for each of the containers, cache service 115 may include one or more repositories that can be shared by the containers.

In the present example of cache service 115, cache service 115 includes the ability to cache data to cache memory addresses for containers 120-122. This cache memory permits data to be cached for each of the containers within shared memory addresses on host system 105. In some implementations, cache service 115 may identify a request from an LSP operation in one of the containers. In response to the request, cache service 115 identifies the appropriate data repository associated with the data request, and accesses the necessary data from the data repository. Once accessed, the required data is placed in cache memory locations by cache service 115, permitting the requesting container to access the requested data.

In some implementations, cache service 115 may be provided with a portion of physical memory from host system 105 that can be allocated to containers 120-122 when a job process is assigned to the containers. This physical memory may include dynamic random-access memory (DRAM), a solid-state memory cache on host system 105, or some other memory cache for data for the containers. Using the example above, when data is retrieved for the requesting container, the data may be cached in address locations of physical memory associated with the cache service and the specific requesting container. Once cached, the requesting container may process the data from the cache memory and process the data as required.

Figure 2:
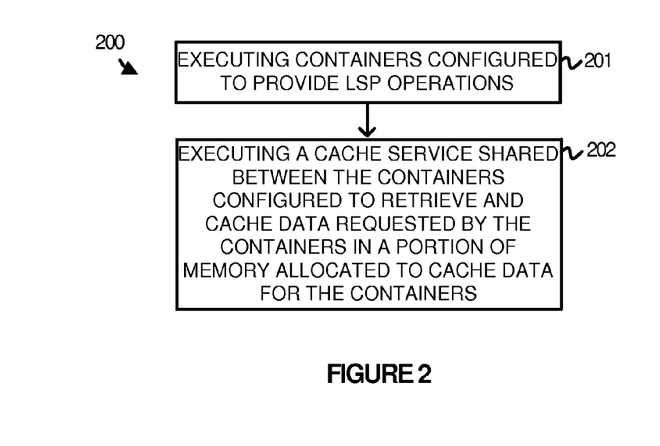
FIG. 2 illustrates a method of providing data to a large-scale data processing architecture.

Referring now to FIG. 2, FIG. 2 illustrates a method 200 of providing data to a large-scale data processing architecture according to one implementation. Method 200 is demonstrated in the example below using elements and systems of computing architecture 100 from FIG. 1.

As illustrated in FIG. 2, method 200 includes executing containers configured to provide LSP operations (201). These operations may include processes related to Apache Hadoop, Apache Spark, or some other large-scale processing operation. The large-scale processing operations are used by varying job processes to efficiently process and manipulate large data sets.

In addition to executing the containers, method 200 further includes executing a cache service shared between the containers configured to retrieve and cache data requested by the containers in a portion of memory allocated to cache data for the containers (202). As depicted in FIG. 1, cache service 115 may comprise a shared resource accessible by each of the containers executing on host system 105. This shared resource may include one or more binaries and libraries that assist the containers in retrieving and writing data to repositories for the job process. In particular, referring still to FIG. 1, a LSP operation within a container may generate a data request for a segment of data. As a request is generated by the LSP operation, cache service 115 identifies the request and identifies a corresponding repository of repositories 141-142 for the request. Once a repository is identified, cache service 115 may access the data and cache the data in cache memory locations accessible and allocated to the requesting container.

In at least one implementation, cache service 115 may be provided with memory locations that can be allocated to the individual containers and LSP operations. For example, when a job process is allocated to containers 120-122 on host system 105, cache service 115 may allocate a portion of the cache memory to each of the containers, permitting the containers to use cache memory for data processing.

As an illustrative example, container 120 may request data for a job process using LSP operation 130. As the request is generated by container 120, cache service 115 identifies the data request, and determines the appropriate data repository to support the data request. In some implementations, data may be stored in multiple repositories with multiple file system or data object formats. These formats may include, but are not limited to, versions of the Hadoop distributed file system (HDFS), versions of the Google file system, versions of the Gluster file system (GlusterFS), or versions of Swift data storage. To determine the appropriate data repository to support the request, cache service 115 identifies the request using a first data access format. This data access format may comprise a format associated with the LSPF of container 120, such as HDFS for a Hadoop LSP operation, or may comprise an arbitrary data access format that can be used across varying LSPFs. Once the request is received in the first format, cache service 115 identifies a repository to accommodate the request and translates the first access format into the format required by the identified repository. Thus, if data repository 142 were required, the first access format may be translated into an access format for data repository 142. Once translated, cache service 115 may access the data and cache the data within the portion of cache memory associated with container 120, making the data accessible to requesting container 120.

In some implementations, each container of containers 120-122 may be allocated a quality of service. This quality of service may be based on the job process for the container, may be based on the tenant or user that generated the job process for the container, or may be based on any other similar quality of service. Based on the quality of service associated with each of the containers or the job process, cache memory may be allocated to the containers to cache data for processing during the job process. Accordingly, cache service 115 may be provided with a portion of physical memory, which in response to an assignment of a job process may be allocated to the individual containers based on the defined quality of service. For example, if container 120 were allocated a higher quality of service than containers 121-122, container 120 may be provided with a larger share of cache memory than containers 121-122.

Although demonstrated in the previous example with a data read request from the containers, it should be understood that cache service 115 might write data to repositories 141-142 in data sources 140. This write process may include cache service 115 identifying new data within the cache memory to be written to a data repository, identifying the appropriate repository to store the data, and accessing the identified repository to store the data.

Figure 3:
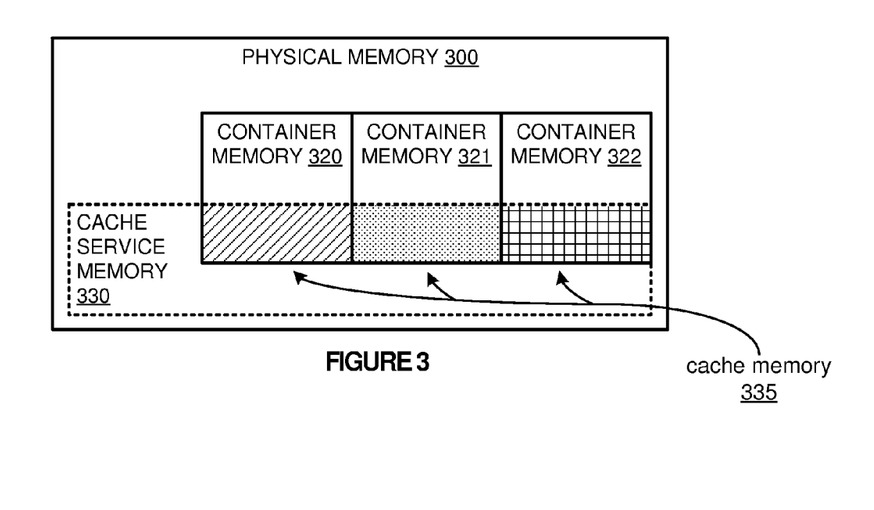
FIG. 3 illustrates an allocation of physical memory to large-scale data processing containers and a cache service.

Turning to FIG. 3, FIG. 3 illustrates an allocation of physical memory 300 to large-scale data processing containers and a cache service. Physical memory 300 is representative of the physical memory for a host system and includes cache service memory 330 and container memory 320-322. Cache service memory 330 is representative of the physical memory to operate a cache service to retrieve and write data for LSP operations in containers on a host system. Container memory 320-322 is representative of the physical memory allocated to containers, permitting the containers to execute on the host computing system.

As described herein, containers are initiated on a host computing system to provide large-scale processing operations for an organization. These containers are allocated resources, including memory and processing cycles, which prevent the operations of an individual container from being integrated with the operations of other containers on the physical host computing system. In the present example, in addition to the memory that is allocated to the containers, the containers may be provided with cache memory 335 that is capable of caching data for the processes of the containers. This data may include data that is to be read by the containers, data that is to be written to storage repositories from the containers, or any other caching of data for the containers.

Here, cache service memory 330 represents memory of a cache service that is used to identify data requests for the LSP operations within the containers. Once a request is identified for a LSP operation in a container, the cache service determines a storage location in one or more storage repositories to retrieve the required data, and caches the data within cache memory 335. For example, if the container associated with container memory 320 requested a segment of data from a HDFS repository, the cache service would identify the required data segment, retrieve the data from the HDFS repository, and cache the data within a portion of cache memory 335 allocated to the container. Once the data is cached, the container may access and process the data as required.

In some implementations, the containers may use a file or object request format that is different from the format that is required for the storage repository. Consequently, when the cache service identifies a request in a first format, the cache service may translate the access request to the required format for the data repository, and access the data using the required format. Once the data is accessed, the cache service may cache the data in physical memory 300 in a manner expected by the container using first access format. Accordingly, if the containers were using an arbitrary access format, the cache service may identify the request in the arbitrary format, identify the format required for the storage repository, translate the request into the format required for the storage repository, and access the data using the required format. Once the data is accessed, the data may be cached in addresses of cache memory 335 allocated to the particular container.

As depicted in FIG. 3, each of the containers may be allocated a portion of cache memory 335, which is separate from the other containers on the same physical host. Further, although not illustrated in the present example, it should be understood that the amount of cache memory 335 allocated to each of the containers might be different based on a quality of service associated with the container. For example, the cache allocated to the container associated with container memory 320 might be larger than the cache memory allocated to the containers associated with container memory 321-322. This quantity of cache memory for each container may be dictated based on a quality of service for the container, based on the job process allocated to the container, based on the tenant or user that generated the job process, or determined in any other similar manner. In some implementations, cache memory 335 may be allocated to the individual containers by the cache service when the job processes are initiated on the containers.

Although not illustrated in the present example, it should be understood that in some implementations, the cache service associated with cache service memory 330 and the containers associated with container memory 320-322 may execute within a virtual machine of a host computing system. Consequently, when allocating the memory for cache memory 335, cache service memory 330 may allocate physical memory that is associated with the virtual machine to the containers. For example, the cache service may be provided with three gigabytes of memory from the virtual machine to be allocated to the containers, and provide portions of the three gigabytes to each of the containers when they are initiated for a job process.

Figure 4:
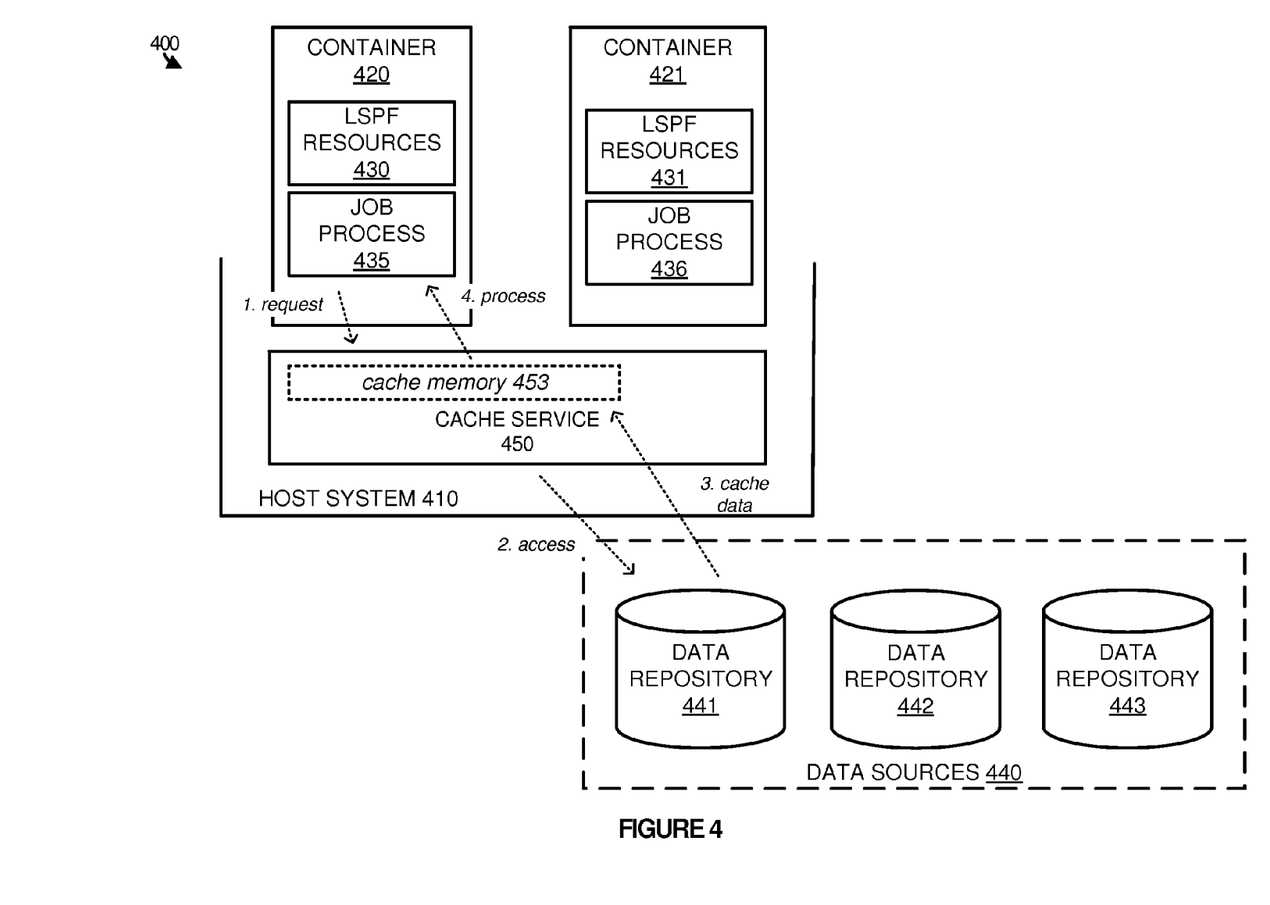
FIG. 4 illustrates an operational scenario of providing data to large-scale processing containers using a cache service.

Turning to FIG. 4, FIG. 4 illustrates an operational scenario 400 of providing data to large-scale processing containers using a cache service. Operational scenario 400 includes host system 410 and data sources 440. Host system 410 further includes containers 420-421 and cache service 450. Containers 420-421 include LSPF resources and job processes 435-436. Job processes 435-436 use LSPF resources 430-431 to execute data operations in parallel with other processing nodes within the computing environment.

In operation, containers 420-421 are generated with LSPF resources 430-431 to provide a platform for multi-node clustered data processing. These containers are provided with separate user space and physical memory on the host system 410, permitting each of the nodes to operate separately on the host computing system. In the present example, in addition to sharing an operating system resource provide by host system 410, which often includes a Linux operating system, the containers are further configured to share a cache memory space represented in operational scenario 400 by cache memory 453. To provide the required data to cache memory 453, cache service 450 is provided, which comprises processing instructions to identify data requests of the containers and accesses the data from data sources 440. Although illustrated as separate from the containers in the present example, it should be understood that cache service 450 might comprise a process that can be executed at least partially within the containers to identify the data request.

Once the containers are initiated on the host computing system and provided with the job processes, the job processes may require access to data sources to retrieve and store data. In the present implementation, job process 435 on container 420 generates a data request to retrieve data from data sources 440. Once a data request is generated, cache service 450 identifies the request, and determines a particular data repository to accommodate the request. In some implementations, the processing clusters may request data from a variety of data repositories, wherein the data repositories may store data in a variety of file system and object formats. These formats may include versions of HDFS, versions of the Google file system, versions of GlusterFS, versions of Swift data storage, or any other similar distributed file system or object based storage. Accordingly, because the nodes may access repositories of varying file system and object storage formats, the cache service may be required to translate each of the requests for the job process into the appropriate access format for the data repository.

For example, if job process 435 comprised a Swift job process attempting to access data in a HDFS storage repository. Cache service 450 would identify the request in the Swift access format and translate the request into the access format appropriate for the HDFS storage repository. In the example of operational scenario 400, cache service 450 identifies that data repository 441 is the appropriate repository to satisfy the data request. This identification may be made using a namespace included in the data request, a file path included in the data request, credentials included in the data request, an address associated with the data request, or by any other similar identification methods. Once identified, cache service 450 ensures that the access format is appropriate for data repository 441 and accesses the data from the repository.

After accessing the data, cache service 450 caches the data in memory addresses accessible to container 420 and job process 435. In particular, cache service 450 is provided with cache memory that can be allocated to job processes and containers as they are required. For example, when containers 420-421 and job processes 435-436 are initiated on host system 410, cache service 450 may allocate portions of cache memory to each of the containers. Once allocated, data for requests by container 420 may be placed in memory addresses associated with cache memory 453 to be provided to job process 435.

Although illustrated in the present example as retrieving data from the data sources, it should be understood that similar operations apply to writing data to the data sources. For example, if job process 435 were to write to data repository 441, cache service 450 would identify the write and the associated data within cache memory 453. Once the data is identified, cache service 450 may identify the appropriate access format to write to data repository 441. After identification of the appropriate access format, cache service 450 may execute the write to data repository 441.

Figure 5:
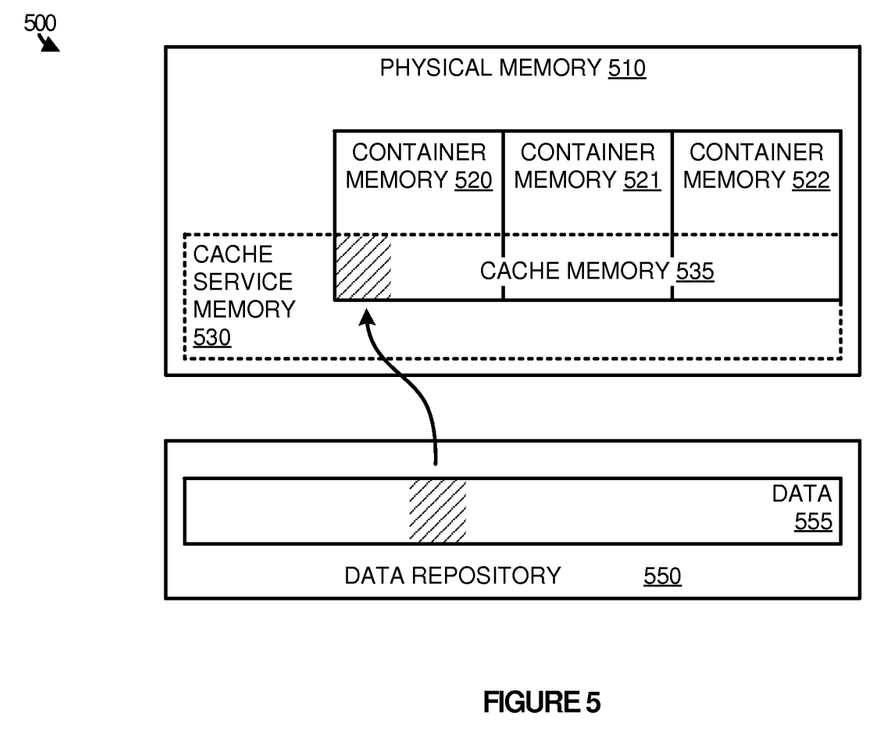
FIG. 5 illustrates an operational scenario of providing data to cache memory in a large-scale data processing environment.

Turning to FIG. 5, FIG. 5 illustrates an operational scenario 500 of providing data to cache memory in a large-scale data processing environment. Operational scenario 500 includes physical memory 510 representative of memory for a physical host computing system, and further includes data repository 550 representative of one or more computing systems and storage systems capable of storing data for processing within a LSPE. Physical memory 510 further includes container memory 520-522, cache service memory 530, and cache memory 535.

As described herein, containers are initiated on a host computing system to efficiently use the processing resources provided by the host computing system. To provide data to the LSP operations on the individual application containers, a cache service is provided, which identifies requests from the containers and retrieves the data for the containers. This cache service may comprise a shared function provided to the containers capable of identifying and accessing the appropriate data for the container. In the present example, the LSP operation associated with container memory 520 requests a segment of data 555 from data repository 550. To accommodate the request, the cache service associated with cache service memory 530 accesses the data and caches the data in a portion of cache memory 535 associated with the container. Once the data is cached within cache memory 535, the LSP operations within the container may access the data and provide the required operations.

Although illustrated as identical in size in the present implementation, it should be understood that in some examples, the amount of cache memory 535 allocated to each of the containers may be dynamic based on a variety of factors. Such factors may include, but are not limited to, the size of the job associated with the container, the quality of service associated with the container, or the quality of service associated with the particular job process. Accordingly, if the container corresponding to container memory 520 were allocated a better quality of service than the containers associated with container memory 521-522, then the cache memory 535 available to the container for container memory 520 may be larger than for the other containers.

Despite being illustrated in the example of operational scenario 500 with a read request for the container, it should also be understood that similar operations apply to write requests from the container. Instead of retrieving the required segment of data 555, the cache service may identify that a write occurred for the application container, identify the data that was written to cache memory 535, and initiate a write process to data 555. This write process may include translating the write request into the appropriate format for data repository 550 in some implementations.

Further, although not illustrated in the present example, it should be understood that physical memory 510 may comprise memory allocated to a host virtual machine capable of executing the containers associated with container memory 520-522 and the cache service associated with cache service memory 530. In particular, a physical computing system, such as a serving computer, a desktop computer, or some other similar computing system may execute virtual machines to more efficiently use the processing resources of the physical computing system. These virtual machines or hosts for the containers may be provided with a segment of physical memory that can be allocated to the containers, the cache service, and the cache memory for the LSP operations.

Figure 6:
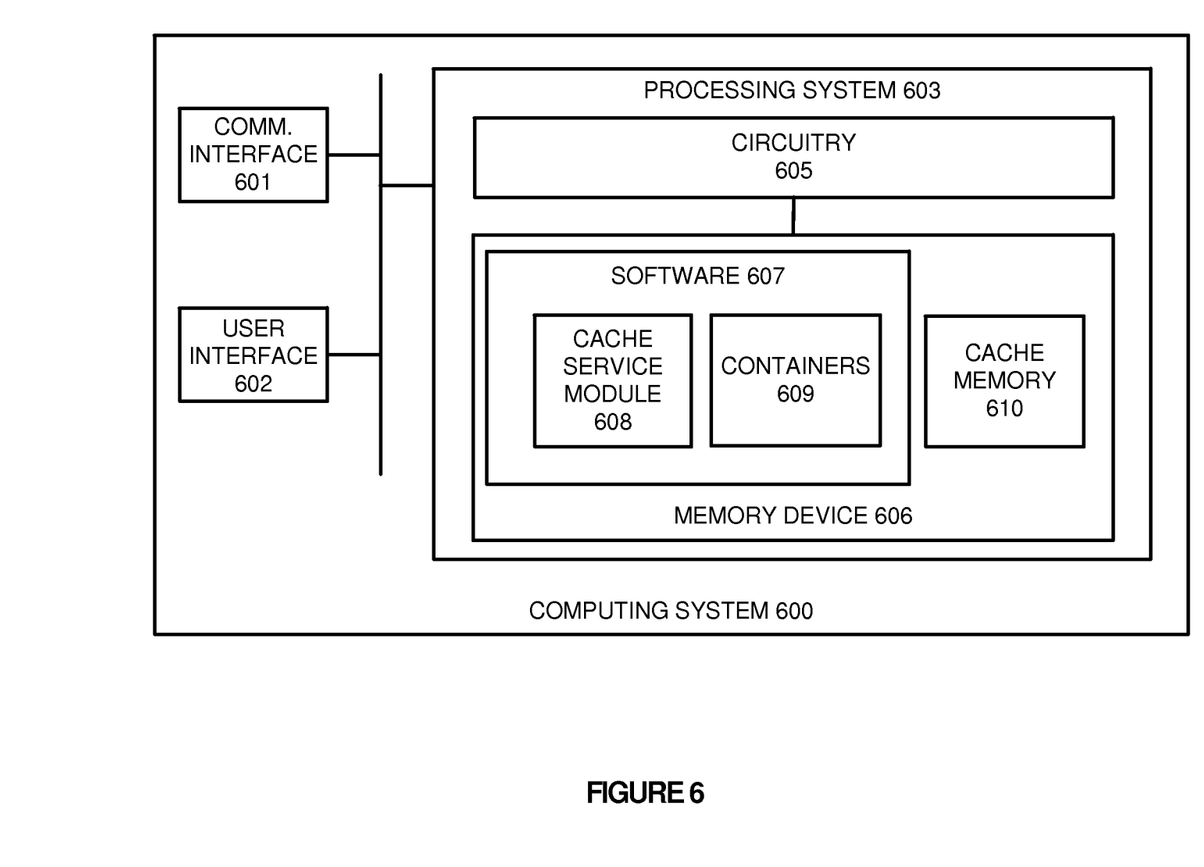
FIG. 6 illustrates a computing system for providing data to large-scale data processing containers.

FIG. 6 illustrates a computing system 600 for providing data to large-scale data processing containers. Computing system 600 is representative of any computing system or systems with which the various operational architectures, processes, scenarios, and sequences disclosed herein for a host computing system may be implemented. Computing system 600 is an example of host system 105 and host system 410, although other examples may exist. Computing system 600 may comprise one or more server computing systems, desktop computing systems, routers, gateways, switches, and other similar computing elements, including combinations thereof. Computing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 is configured to communicate with one or more other computing systems capable of hosting storage repositories for the LSP operations. Further, in some implementations, computing system 600 may be communicatively coupled to a configuration or management system that configures the containers and processing jobs that execute on computing system 600.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Memory device 606 comprises cache memory 610, which may be allocated to containers 609 by cache service module 608. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes cache service module 608 and containers 609, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein.

In particular, containers 609 are executed by processing system 603 to provide LSP cluster operations for one or more tenants of a computing environment. These containers are configured with Hadoop processes, Spark processes, or any other similar process that can distribute a data processing operation across one or more processing nodes. In the present implementation, in addition to the containers, software 607 further includes cache service module 608. Cache service module 608 directs processing system 603 to identify data requests for containers 609, determine a storage repository associated with the data request, and access the data associated with the request from the determined storage repository. In some implementations, to access the storage repository, cache service module 608 directs processing system 603 to translate the access format for the data request from the container, into an access format for the storage repository. Consequently, if the container were to request data in accordance with GlusterFS, but the data were stored in a HDFS repository, cache service module 608 may direct processing system 603 to translate the request into a format capable of accessing the HDFS repository.

Once the data is accessed via cache service module 608, cache service module 608 directs processing system 603 to cache the data in a portion of cache memory 610 allocated for the requesting container. In particular, when job processes or containers are initiated on the host computing system, cache service module 608 allocates a portion of available cache memory to each of the containers. In some implementations, these portions of cache memory may be allocated based on a quality of service associated with the job processes or containers on the host. Accordingly, if a job process on one container required a better quality of service than the other containers on the same host, that container may be provided with a larger portion of cache memory than the other containers.

In addition to providing the operations to read data into cache memory 610, cache service module 608 further directs processing system 603 to initiate write processes to the storage repositories associated with the LSP operations. In particular, when a write is detected by cache service module 608, cache service module 608 determines an appropriate storage repository for the write, makes any necessary translations of the access format, and initiates the write to the storage repository from cache memory 610. This may include transferring the data from cache memory 610 to the storage repository and specifying a storage location for the data within the storage repository.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts. It is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A service architecture for large-scale data processing, the service architecture comprising:
   a plurality of containers executing a large-scale processing framework on a host system;
   a cache service executing on the host system shared by the plurality of containers, the cache service configured to:
   identify a data request from a container in the plurality of containers in accordance with a first data access format;
   identify a storage repository for the data request from a plurality of storage repositories, wherein the plurality of storage repositories is accessible using one or more secondary data access formats;

access data associated with the data request from the storage repository in accordance with a second data access format associated with the storage repository, wherein the first data access format and second data access format each comprise a file system format or data object storage format; and cache the data in a portion of a cache memory on the host system allocated to the container, wherein the cache memory comprises a plurality of portions each allocated to a different one of the plurality of containers, and wherein each portion of the plurality of portions comprises memory addressable by the cache service and a container associated with the portion.

2. The service architecture of claim 1 wherein the large-scale processing framework comprises a Hadoop processing framework.

3. The service architecture of claim 1 wherein the large-scale processing framework comprises a Spark processing framework.

4. The service architecture of claim 1 wherein the cache service executing on the host system is further configured to allocate the plurality of portions of the cache memory to each container in the plurality of containers.

5. The service architecture of claim 4 wherein the cache service executing on the host system configured to allocate the plurality of portions of the cache memory to each container in the plurality of containers is configured to allocate the plurality of portions of the cache memory to each container in the plurality of containers responsive to an assignment of a job process to the plurality of containers.

6. The service architecture of claim 1 wherein the plurality of portions of the cache memory each allocated to one of the plurality of containers comprises the plurality of portions of the cache memory each allocated to one of the plurality of containers based on a quality of service associated with each container in the plurality of containers.

7. The service architecture of claim 1 wherein the cache service is further configured to:
  identify a data write from the container to the storage repository;
  identify second data associated with the data write within the cache memory; and
  write the data associated with the data write to the storage repository.

8. A method of providing data to a large-scale data processing architecture, the method comprising:
  identifying a data request in accordance with a first data access format from a container in a plurality of containers executing on a host system, wherein the plurality of containers each run an instance of a large-scale data processing framework;
  identifying a storage repository for the data request from a plurality of storage repositories, wherein the plurality of storage repositories is accessible using one or more secondary data access formats;
  accessing data associated with the data request from the storage repository in accordance with a second data access format associated with the storage repository, wherein the first data access format and second data access format each comprise a file system format or data object storage format; and
  caching the data in a portion of a cache memory on the host system allocated to the container, wherein the cache memory comprises a plurality of portions each allocated to a different one of the plurality of containers, and wherein each portion of the plurality of portions comprises memory addressable by the cache service and a container associated with the portion.

9. The method of claim 8 wherein the large-scale processing framework comprises a Hadoop processing framework.

10. The method of claim 8 wherein the large-scale processing framework comprises a Spark processing framework.

11. The method of claim 8 further comprising allocating the plurality of portions of the cache memory to each container in the plurality of containers.

12. The method of claim 11 wherein allocating the plurality of portions of the cache memory to each container in the plurality of containers comprises allocating the plurality of portions of the cache memory to each container in the plurality of containers responsive to an assignment of a job process to the plurality of containers.

13. The method of claim 11 wherein the plurality of portions of the cache memory each allocated to one of the plurality of containers comprises the plurality of portions of the cache memory each allocated to one of the plurality of containers based on a quality of service associated with each container in the plurality of containers.

14. The method of claim 8 wherein the method further comprises:
  identifying a data write from the container to the storage repository;
  identifying second data associated with the data write within the cache memory; and
  writing the second data associated with the data write to the storage repository.

15. An apparatus to access data for a large scale processing architecture, the apparatus comprising:
  one or more computer readable media;
  processing instructions stored on the one or more computer readable media to provide a cache service on a host system that, when executed by a processing system, direct the processing system to:
    identify a data request in accordance with a first data access format from a container in a plurality of containers executing on the host system, wherein the plurality of containers each run an instance of a large-scale processing framework;
    identify a storage repository associated with the data request from a plurality of storage repositories, wherein the plurality of storage repositories is accessible using one or more secondary data access formats;
    access data associated with the data request from the storage repository in accordance with a second data access format associated with the storage repository, wherein the first data access format and second data access format each comprise a file system format or data object storage format; and
    cache the data in cache memory for the plurality of containers, wherein the cache memory comprises an allocated portion of memory on the host system addressable by the container and the cache service.

16. The apparatus of claim 15 wherein the large-scale processing framework comprises a Hadoop processing framework.

17. The apparatus of claim 15 wherein the large-scale processing framework comprises a Spark processing framework.

18. The apparatus of claim 15 wherein the processing instructions further direct the processing system to allocate the plurality of portions of the cache memory to each container in the plurality of containers based on a quality of service associated with each container in the plurality of containers.

19. The apparatus of claim 15 wherein the processing instructions further direct the processing system to:
- identify a data write from the container to the storage repository;
- identify second data associated with the data write within the cache memory; and
- write the second data associated with the data write to the storage repository.

\* \* \* \* \*